US012607953B1

(12) United States Patent
Yu

(10) Patent No.: US 12,607,953 B1
(45) Date of Patent: Apr. 21, 2026

(54) METHOD AND APPARATUS FOR CLEANING TONER CARTRIDGE

(71) Applicant: GENERAL PLASTIC INDUSTRIAL CO., LTD., Taichung City (TW)

(72) Inventor: Thn-Chn Yu, Taichung City (TW)

(73) Assignee: GENERAL PLASTIC INDUSTRIAL CO., LTD., Taichung City (TW)

( * ) Notice: Subject to any disclaimer, the term of this patent is extended or adjusted under 35 U.S.C. 154(b) by 0 days.

(21) Appl. No.: 19/024,541

(22) Filed: Jan. 16, 2025

(51) Int. Cl.
*G03G 15/08* (2006.01)

(52) U.S. Cl.
CPC ....... *G03G 15/0894* (2013.01); *G03G 15/087* (2013.01); *G03G 2215/00987* (2013.01); *G03G 2215/0678* (2013.01)

(58) Field of Classification Search
CPC ......................... G03G 15/087; G03G 15/0894
USPC .................................................. 399/109, 262
See application file for complete search history.

(56) References Cited

U.S. PATENT DOCUMENTS 6,802,910 B2 * 10/2004 Murakami ................ F26B 5/12 399/257
7,817,945 B2 * 10/2010 Mase .................. G03G 15/087 399/262

FOREIGN PATENT DOCUMENTS

CN 1603973 A * 4/2005

* cited by examiner

*Primary Examiner* — Hoan H Tran
(74) *Attorney, Agent, or Firm* — Birch, Stewart, Kolasch & Birch, LLP

(57) ABSTRACT

A method for cleaning a toner cartridge includes the steps of taking a toner cartridge provided at a first end and a second end thereof with a first opening and a second opening respectively, engaging an air-blowing connector with the first opening, inserting the second end of the toner cartridge into a tubular barrel which is provided with a conduit extending along an axial direction and an air nozzle connected with the conduit, and drawing air from the tubular barrel to create a negative pressure inside the tubular barrel, and introducing air into the toner cartridge through the air-blowing connector, and the conduit and the air nozzle to generate an airflow to carry residual toner inside the toner cartridge through the second opening into the tubular barrel to be extracted. Accordingly, the method may effectively remove residual toner from the toner cartridge.

12 Claims, 6 Drawing Sheets

METHOD AND APPARATUS FOR CLEANING TONER CARTRIDGE

BACKGROUND OF THE INVENTION

1. Field of the Invention

The present invention relates generally to electronic image-forming apparatus and more particularly, to a method and an apparatus for cleaning a toner cartridge.

2. Description of the Related Art

Electronic image-forming apparatus, such as multifunctional printer and copier, is usually equipped with black or other color toners for printing grayscale or color documents. When the toner in a toner cartridge is depleted, the used toner cartridge is replaced with a new one. However, since the used toner cartridge often contains residual toner, it is necessary to clean the residual toner before refilling the cartridge with new toner for reuse.

Conventional method for cleaning residual toner typically involves an operator manually using an air gun to spray high-pressure air onto the inner wall of the toner cartridge, causing the toner to detach from the inner wall and be carried away by the airflow. However, this way will disperse toner particles into the ambient air, which not only pollutes the environment but also poses health risks to the operator if the operator inhales the toner particles. Therefore, how to effectively remove residual toner without polluting the environment or endangering human health has become an issue that the industry seeks to address.

SUMMARY OF THE INVENTION

The present invention has been accomplished in view of the above-noted circumstances. It is an objective of the present invention to provide a method and an apparatus for cleaning a toner cartridge, which can effectively remove residual toner from the cartridge without polluting the environment or endangering human health.

To attain the above-mentioned objective, the present invention provides a method for cleaning a toner cartridge, comprising the steps of a) taking a toner cartridge provided at a first end and a second end thereof with a first opening and a second opening, respectively, b) engaging an air-blowing connector with the first opening, c) inserting the second end of the toner cartridge into a tubular barrel, which is provided at an inside thereof with a conduit extending along an axial direction and an air nozzle connected with the conduit, in a way that when the toner cartridge is inserted into the tubular barrel, the air nozzle simultaneously extends inside the toner cartridge through the second opening, and d) drawing air from the tubular barrel to create a negative pressure inside the tubular barrel, and introducing air into the toner cartridge through the air-blowing connector, and the conduit and the air nozzle to generate an airflow to carry residual toner inside the toner cartridge through the second opening into the tubular barrel to be extracted. Accordingly, the method of the present invention can effectively remove residual toner from the toner cartridge without polluting the environment or endangering human health.

To attain the above-mentioned objective, the present invention provides an apparatus for cleaning a toner cartridge having a first opening and a second opening. The apparatus comprises a tubular barrel and an air-blowing connector. The tubular barrel comprises a barrel body for accommodating at least a part of the toner cartridge, a conduit extending along an axial direction of the barrel body and disposed inside the barrel body, and an air nozzle connected with the conduit and configured to extend into the toner cartridge through the second opening. The air-blowing connector is adapted to be disposed at the first opening of the toner cartridge. Accordingly, the apparatus of the present invention can effectively remove residual toner from the toner cartridge without polluting the environment or endangering human health.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Hereunder one embodiment will be detailedly described with accompanying drawings for illustrating technical features and structure of the present invention. As shown in FIGS. 1-5, the method for cleaning a toner cartridge provided by a preferred embodiment of the present invention includes the following steps.

Figure 1:
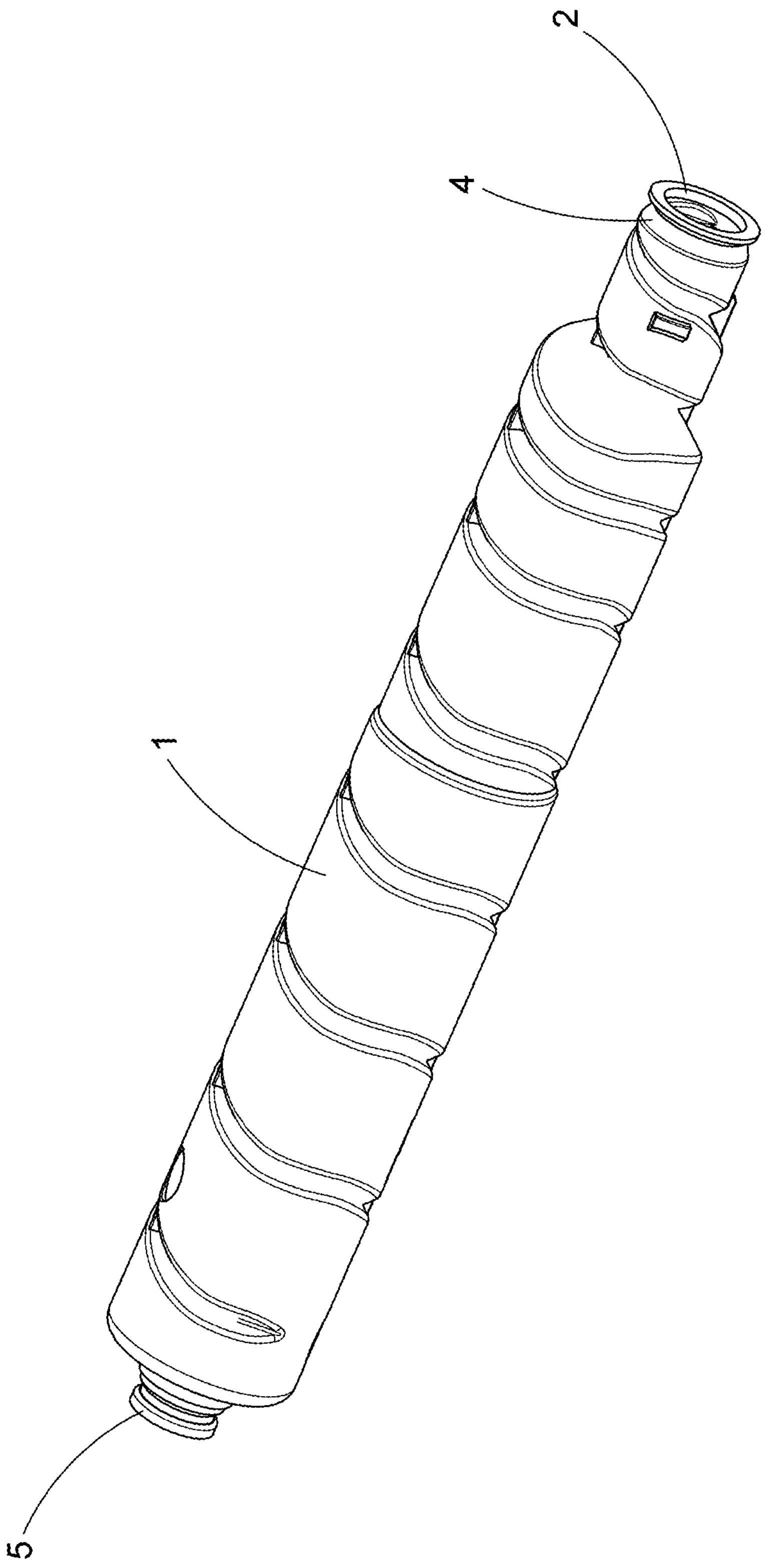
FIG. 1 is a perspective view of a toner cartridge according to a preferred embodiment of the present invention.

Step a): Take a toner cartridge 1 having a first opening 2 and a second opening 3, as shown in FIG. 1. The first opening 2 is located at the first end 4 of the toner cartridge 1, and the second opening 3 is located at the second end 5. The first opening 2 is used for outputting toner, and the second opening 3 is used for filling or refilling toner and may, but not limited to, be formed by cutting the second end 5 after the toner is depleted. The toner cartridge 1 is the one that has been recycled after the toner is depleted, but residual toner still adheres to its inner or outer walls. In this embodiment, the first end 4 is designated as the front end, and the second end 5 is designated as the rear end; however, these designations can be reversed.

Figure 2:
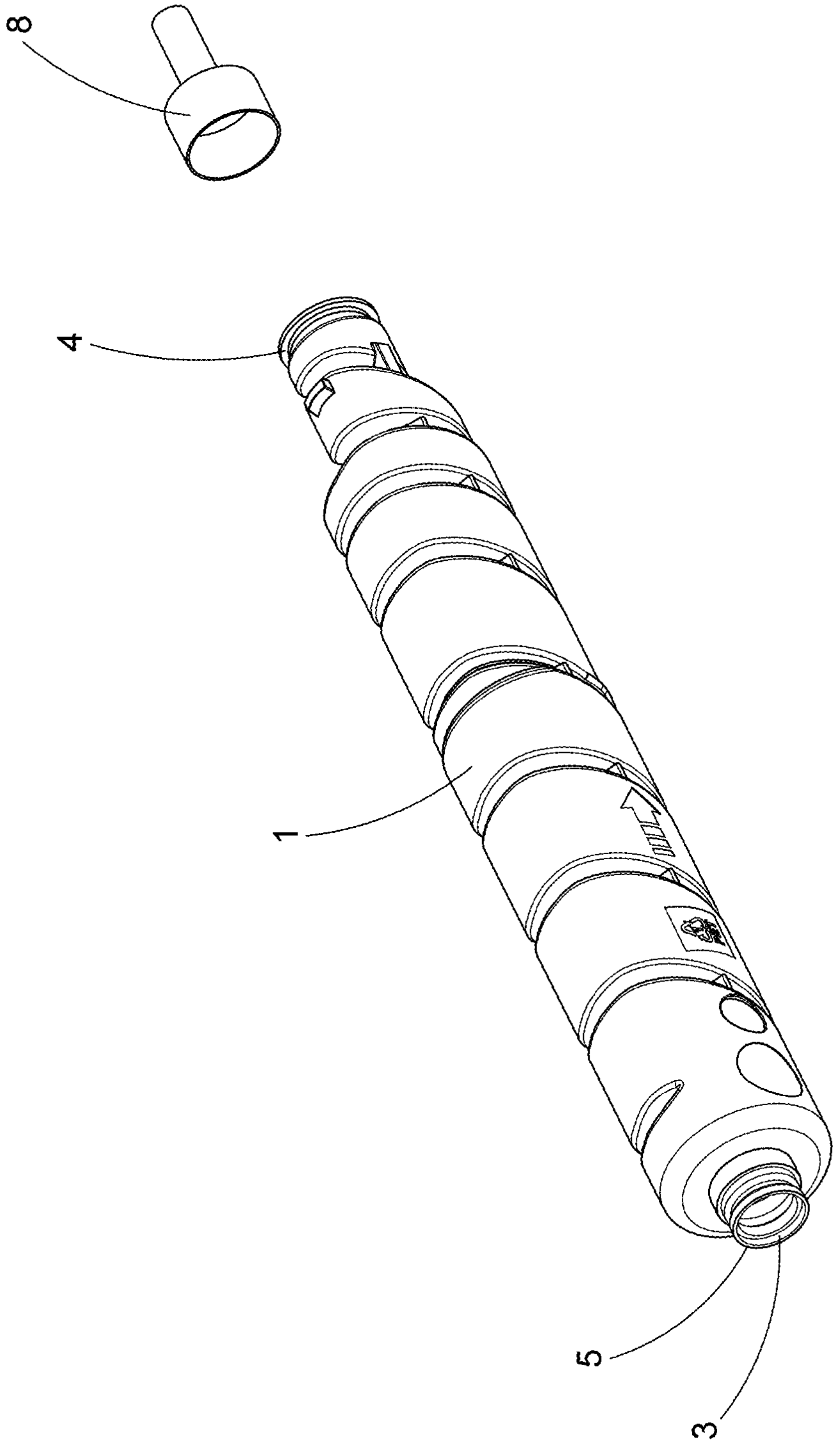
FIGS. 2 and 3 are perspective views, showing the toner cartridge and components of an apparatus for cleaning the toner cartridge according to the preferred embodiment of the present invention.
Figure 3:
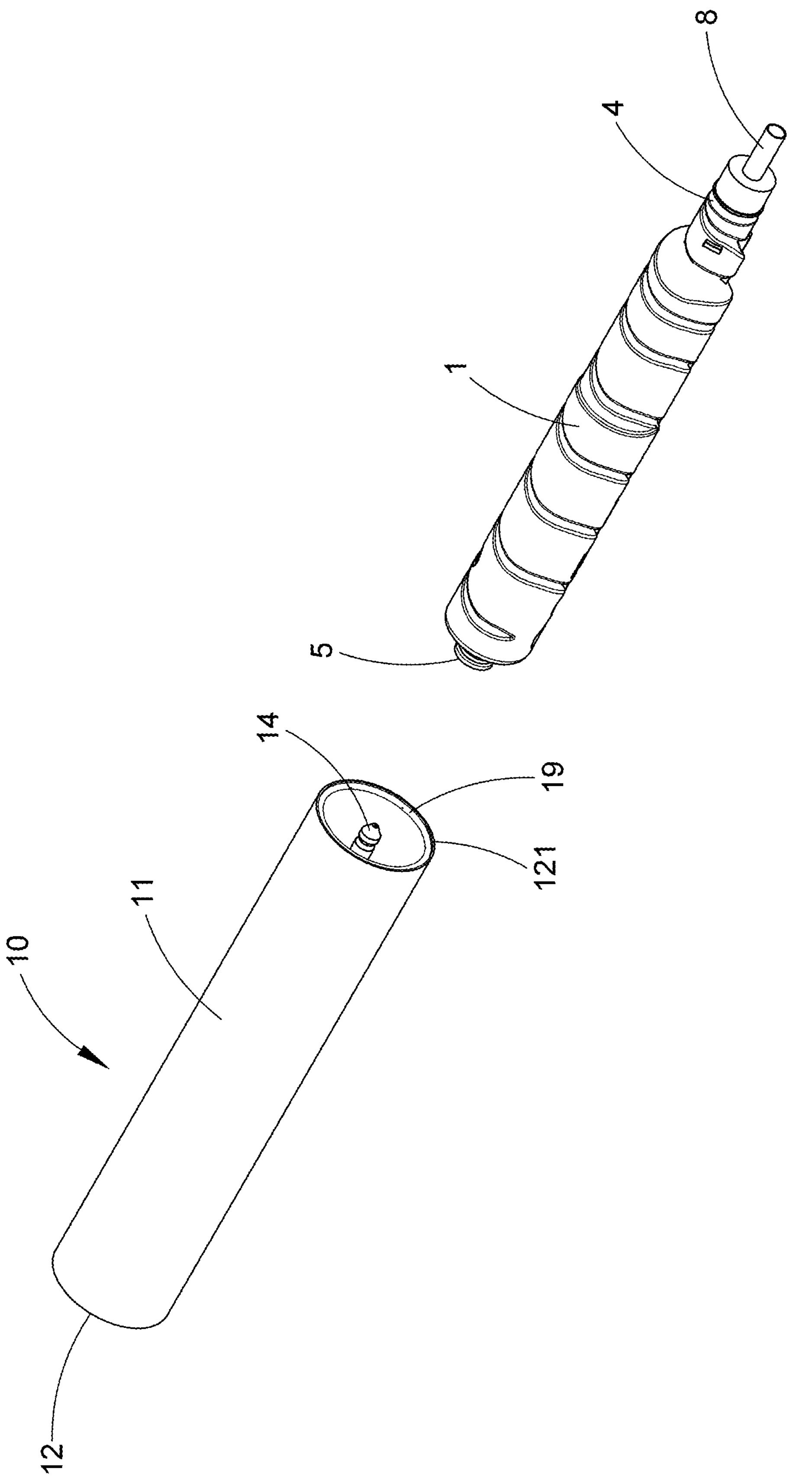

Step b): Engage an air-blowing connector 8 with the first opening 2, as shown in FIGS. 2 and 3. The air-blowing connector 8 is connected with, i.e. in fluid communication with, an air compressor (not shown).

Figure 4:
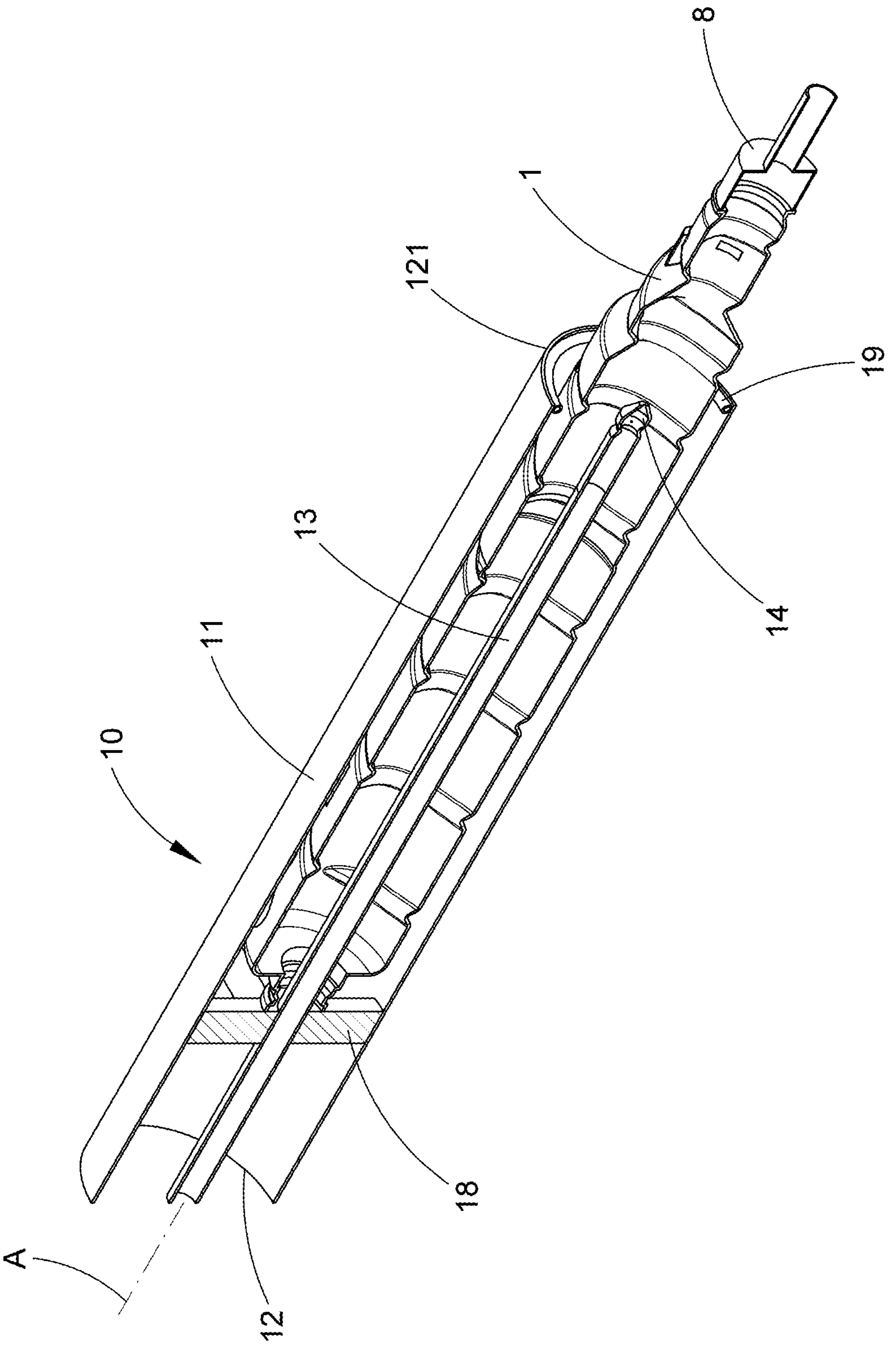
FIG. 4 is a cross-sectional view, showing the toner cartridge and the apparatus for cleaning the toner cartridge of the preferred embodiment of the present invention.
Figure 5:
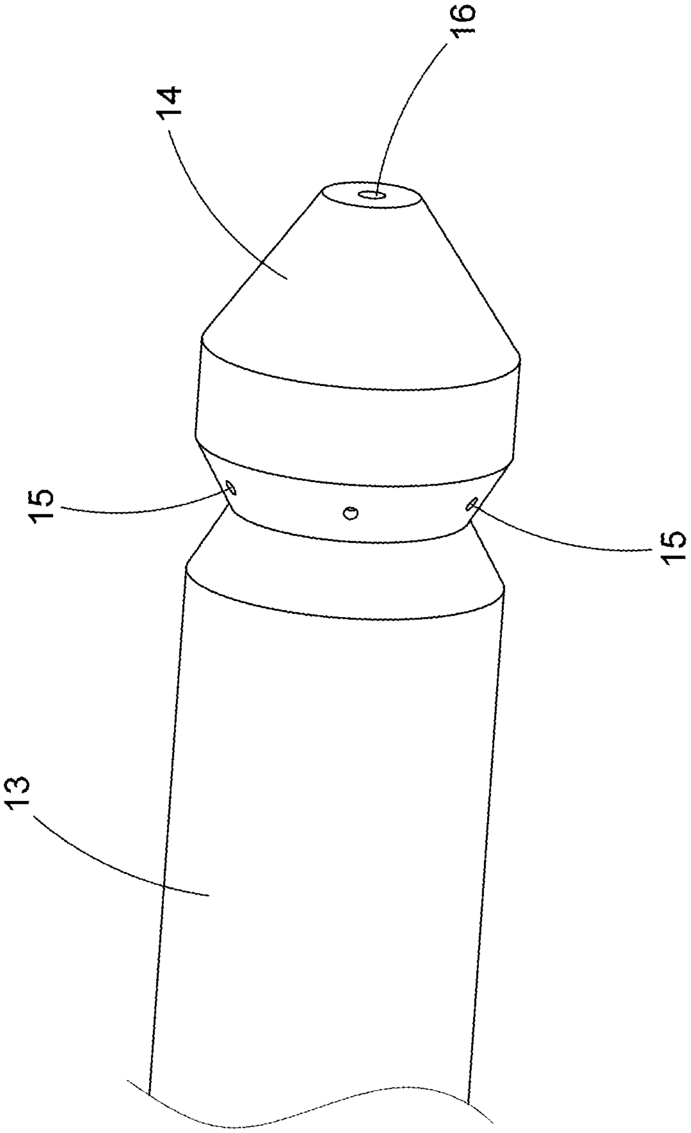
FIGS. 5 and 6 are perspective views of components of the apparatus for cleaning the toner cartridge of the preferred embodiment of the present invention.
Figure 6:
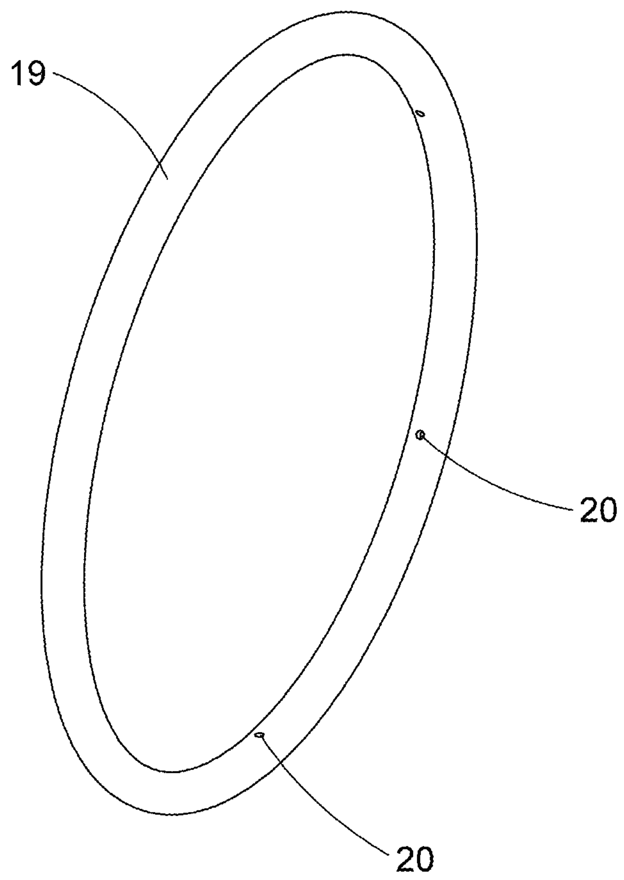

Step c): Insert the toner cartridge 1, with its second end 5, into a tubular barrel 10, as shown in FIG. 4. The tubular barrel 10 is provided at an inside thereof with a conduit 13 and an air nozzle 14 connected with the conduit 13. The conduit 13 extends along an axial direction A and is connected with the air compressor (not shown). With this arrangement, when the toner cartridge 1 is inserted into the tubular barrel 10, the conduit 13 and the air nozzle 14 simultaneously extend into the interior of the toner cartridge 1 through the second opening 3. As shown in FIG. 5, the air nozzle 14 is provided with a plurality of outward air outlets 15 to direct airflow to an inner wall of the toner cartridge 1, and an axial air outlet 16 extending in a direction parallel to the axial direction A of the tubular barrel 10. To prevent the toner cartridge 1 from being inserted too deeply into the tubular barrel 10, the tubular barrel 10 may further include a cross-shaped stop member 18 disposed on the outer wall of the conduit 13 to stop the second end 5 of the toner cartridge 1. In another embodiment, the stop member 18 may be disposed on an inner wall of a barrel body 11 of the tubular barrel 10.

Step d): Draw air out from the tubular barrel 10 to create a negative pressure inside the tubular barrel 10. In this embodiment, an air extraction conduit (not shown) is connected with the rear end 12 of the barrel body 11 to extract air from the barrel body 11 toward the rear. Simultaneously, the air compressor sends air into the toner cartridge 1 through the air-blowing connector 8, and through the conduit 13 and the air nozzle 14. In this way, an airflow will be generated inside the toner cartridge 1 to carry the residual toner inside the toner cartridge 1 through the second opening 3 into the tubular barrel 10 and then being extracted out of the tubular barrel 10.

The outward air outlets 15 can direct air towards the inner wall of the toner cartridge 1, causing the residual toner to detach from the inner wall of the toner cartridge 1. The air-blowing connector 8 can blow air from the front to the rear, pushing the residual toner towards the rear and out of the toner cartridge 1 through the second opening 3. Meanwhile, the axial air outlet 16 directs air forward, which not only creates turbulence but also directs air to reach the corners where other airflows cannot, ensuring thorough cleaning. By means of the cleaning method of the present invention, residual toner inside the toner cartridge 1 can be effectively removed. The extracted toner is immediately carried away by the air extraction conduit, preventing toner particles from dispersing into the ambient air, which could otherwise contaminate the environment or be inhaled by the operator. Therefore, the cleaning method provided by the present invention avoids environmental pollution and health hazards, achieving the objective of the present invention.

To achieve an even better cleaning effect, an additional step e) may be optionally performed after the step d), which involves moving the toner cartridge 1 back and forth within the tubular barrel 10 for allowing the outward air outlets 15 to direct air toward different locations on the inner wall of the toner cartridge 1. Alternatively, the toner cartridge 1 may be rotated about the axial direction A while moving back and forth, enabling the outward air outlets 15 to direct air toward various locations on the inner wall of the toner cartridge 1, thereby detaching residual toner from the inner wall in these locations.

Based on the above-mentioned technical features, various modifications to the method for cleaning the toner cartridge may be made. For instance, the order of the steps b) and c) may be exchanged, or the steps d) and c) may be performed simultaneously. Any such variations that can be easily conceived should fall within the scope of the claims of the present invention.

As shown in FIGS. 3-6, the present invention also provides a cleaning apparatus, which is used to clean a toner cartridge 1 having a first opening 2 and a second opening 3. The cleaning apparatus comprises a tubular barrel 10 and an air-blowing connector 8.

The tubular barrel 10 includes a barrel body 11 for accommodating all or part of the toner cartridge 1, a conduit 13 extending along an axial direction A of the barrel body 11 and installed inside the barrel body 11, an air nozzle 14 connected with the conduit 13 and adapted to extend into the toner cartridge 1 through the second opening 3, a stop member 18 installed on an inner wall of the barrel body 11 or on an outer wall of the conduit 13 to stop the toner cartridge 1, and an air curtain ring 19 installed at the front end 121 of the barrel body 11. The inner lateral side of the air curtain ring 19 is provided with a plurality of inward air outlets 20 for directing airflow to the outer wall of the toner cartridge 1. These inward air outlets 20 can spray off toner adhered to the outer wall of the toner cartridge 1 and form an air curtain to prevent toner from escaping from the front end 121 of the barrel body 11.

The air-blowing connector 8 is used to be installed at the first opening 2 of the toner cartridge 1.

With the above-mentioned structural features, the cleaning apparatus of the present invention can effectively remove residual toner from both the interior and exterior of the toner cartridge 1, without polluting the environment or endangering human health. It is to be mentioned that the stop member 18 and the air curtain ring 19 may be omitted. Furthermore, the outward air outlets 15 of the air nozzle 14 may be configured extending in directions including or excluding a component parallel to the axial direction A of the tubular barrel 10. Such variations are not to be regarded as a departure from the spirit and scope of the invention, and all such modifications as would be obvious to one skilled in the art are intended to be included within the scope of the following claims.

What is claimed is:

1. A method for cleaning a toner cartridge, comprising the steps of:
- a) taking a toner cartridge provided at a first end and a second end thereof with a first opening and a second opening, respectively;
- b) engaging an air-blowing connector with the first opening;
- c) inserting the second end of the toner cartridge into a tubular barrel, which is provided at an inside thereof with a conduit extending along an axial direction, and an air nozzle connected with the conduit, in a way that when the toner cartridge is inserted into the tubular barrel, the air nozzle simultaneously extends inside the toner cartridge through the second opening; and
- d) drawing air from the tubular barrel to create a negative pressure inside the tubular barrel, and introducing air into the toner cartridge through the air-blowing connector, and the conduit and the air nozzle to generate an airflow to carry residual toner inside the toner cartridge through the second opening into the tubular barrel to be extracted.

2. The method as claimed in claim 1, wherein the step b) is performed after the step c) is carried out.

3. The method as claimed in claim 1, wherein the step d) and the step c) are performed simultaneously.

4. The method as claimed in claim 1, further comprising a step e) of moving the toner cartridge back and forth within the tubular barrel.

5. The method as claimed in claim 4, wherein in the step e), the toner cartridge rotates about the axial direction while the toner cartridge moves back and forth.

6. The method as claimed in claim 1, wherein in the step d), the air nozzle directs the air toward an inner wall of the toner cartridge.

7. An apparatus for cleaning a toner cartridge having a first opening and a second opening, the apparatus comprising:

a tubular barrel comprising a barrel body for accommodating at least a part of the toner cartridge, a conduit extending along an axial direction of the barrel body and disposed inside the barrel body, and an air nozzle connected with the conduit and configured to extend into the toner cartridge through the second opening; and an air-blowing connector configured to be disposed at the first opening of the toner cartridge.

8. The apparatus as claimed in claim 7, wherein the tubular barrel further comprises a stop member disposed on an inner wall of the barrel body or on an outer wall of the conduit for stopping the toner cartridge.

9. The apparatus as claimed in claim 7, wherein the tubular barrel further comprises an air curtain ring disposed inside the barrel body; the air curtain ring is provided at an inner lateral side thereof with a plurality of inward air outlets to guide airflow to an outer wall of the toner cartridge.

10. The apparatus as claimed in claim 7, wherein the air nozzle has a plurality of outward air outlets for guiding airflow to an inner wall of the toner cartridge.

11. The apparatus as claimed in claim 10, wherein each of the outward air outlets extends in a direction having a component parallel to the axial direction of the tubular barrel.

12. The apparatus as claimed in claim 7, wherein the air nozzle has an axial air outlet extending in a direction parallel to the axial direction of the tubular barrel.

* * * * *